United States Patent
Cohen et al.

(10) Patent No.: US 8,452,721 B2
(45) Date of Patent: May 28, 2013

(54) REGION OF INTEREST TRACKING FOR FLUID SIMULATION

(75) Inventors: Jonathan Michael Cohen, Ann Arbor, MI (US); Sarah Tariq, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 408 days.

(21) Appl. No.: 12/815,815

(22) Filed: Jun. 15, 2010

(65) Prior Publication Data

US 2011/0307837 A1    Dec. 15, 2011

(51) Int. Cl.
G06F 17/00 (2006.01)
G06N 5/02 (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| 7,091,973 | B1 * | 8/2006 | Cohen ........................... 345/426 |
| 7,191,191 | B2 * | 3/2007 | Peurach et al. ...................... 1/1 |
| 7,212,656 | B2 * | 5/2007 | Liu et al. ........................ 382/118 |
| 7,372,463 | B2 | 5/2008 | Anand |
| 7,542,040 | B2 * | 6/2009 | Templeman ................... 345/474 |
| 7,643,685 | B2 * | 1/2010 | Miller ............................ 382/209 |
| 7,731,588 | B2 * | 6/2010 | Templeman ..................... 463/38 |
| 8,269,778 | B1 | 9/2012 | Baraff et al. |
| 2002/0149622 | A1 | 10/2002 | Uesaki et al. |
| 2006/0085088 | A1 | 4/2006 | Nakayama et al. |
| 2010/0214313 | A1 | 8/2010 | Herman et al. |
| 2010/0235769 | A1 | 9/2010 | Young et al. |

FOREIGN PATENT DOCUMENTS

EP    1918881 B1    5/2008

OTHER PUBLICATIONS

Core Animation Programming Guide, Mac Developer Library, https://developerapple.com/library/mac/#documentation/Cocoa/Conceptual/CoreAnimation_guide/Articles/Layers.html.

* cited by examiner

Primary Examiner — Michael B Holmes (57) ABSTRACT

A method of simulation comprises controlling an avatar in an environment. Movement of graphical elements is simulated in a fluid coordinate frame surrounding said avatar, wherein said graphical elements in said fluid coordinate frame obey a first rule set. Said graphical elements and a first region surrounding said fluid coordinate frame are animated, wherein said graphical elements in said first region obey a second rule set. Said fluid coordinate frame moves in response to said controlling of said avatar. In an embodiment, a blending region blends the movement of graphical elements inside the fluid coordinate frame and outside the fluid coordinate frame.

20 Claims, 8 Drawing Sheets

REGION OF INTEREST TRACKING FOR FLUID SIMULATION

FIELD

Embodiments according to the present invention generally relate to data processing, in particular to computer graphics.

BACKGROUND

Within the field of computer graphics, a variety of algorithms have been developed for high quality simulation of fluid phenomena. These methods have been used in visual effects and for other off-line applications. While many methods have been demonstrated to run interactively in certain situations, they have not been used in widely deployed interactive applications, such as video games. However, two developments have the potential to alter the applicability of interactive fluid dynamics: the rise of highly programmable high-throughput consumer GPUs, and the development of high quality, efficient, and stable methods for evolving 3D fluid systems in time.

For deployment in popular applications such as games or online virtual worlds, ease of integration with existing software architectures and scalability across a range of consumer hardware platforms is desired. Another important consideration is the aesthetic desire to get beyond the "fluid-in-a-box" look typically associated with performing complex fluid calculations inside a fixed rectilinear domain, where the fluid effects stop at the edge of the domain.

Particle-based fluid simulation methods like Smoothed Particle Hydrodynamics (SPH) are attractive because they do not suffer from the limitation to be inside a box. However, enforcing incompressibility is important for accurate production of turbulence, and SPH methods have a hard time enforcing incompressibility efficiently. They also can have difficulty allocating computational elements throughout space efficiently. In particular, they are most effective for fluids with explicit surfaces such as water in a container, and do not work well for fluids that have no interfaces such as air or deep underwater. For these reasons, they have not been demonstrated to be effective for calculating single phase flows such as air around a car. Vortex-based Lagrangian methods enforce incompressibility and can produce turbulent effects, but they are difficult to implement in 3D, especially for complex dynamic boundary conditions.

Eulerian fluid simulation methods can be made interactive for complex flows, can efficiently generate turbulent effects, and are good for fluids not bound by interfaces. However, they typically are confined to a finite rectilinear domain and therefore are hard to use in large environments with unconstrained fluid motion. Grid reshaping and adaptive resolution techniques exist for Eulerian methods, but these techniques are slower than regular grid methods due to their use of sparse data structures, and have not been demonstrated to run at interactive frame rates.

SUMMARY

According to embodiments of the present invention, a finite Eulerian simulation grid is used in an interactive setting to give the appearance of an infinite simulation area. The simulation grid position may be dependent on user interaction or artificial intelligence based input. In addition, blending may be used between the finite Eulerian simulation grid and the infinite simulation area to provide a visually smooth transition. In one example, Newtonian mechanics are used outside the simulation grid.

In a first embodiment, a finite Eulerian simulation grid tracks an avatar, vehicle, or other dynamically controlled object (referred to as the "avatar" below) that is moving through a virtual environment. The motion of the avatar influences a fluid simulation, which then influences particles, causing them to move. User input may control the avatar. Immediately surrounding the avatar and within the Eulerian simulation grid, the particles move according to an Eulerian fluid simulation. Particles that are outside the Eulerian simulation grid move according to a simpler rule set, e.g. Newtonian mechanics.

In a second embodiment, blending is used between simulation grids. As particles move away from the avatar, they encounter a blending region before moving into the world environment. Within the blending region, the particles move according to a blending of the inside rules of the Eulerian fluid simulation and the outside rules of the world environment. The rules of the outside world environment are simpler (e.g. Newtonian mechanics) than the inside rules of the Eulerian fluid simulation, and are not localized to a particular simulation grid. In the blending region, both inside and outside rules apply.

In an alternate embodiment, multiple avatars move through the world environment, each influencing particles. Multiple Eulerian fluid simulations bounded with respective simulation grids track each avatar. Thus, particles may be influenced by multiple avatars and the world environment when blending regions overlap. For particles within overlapping blending regions, the particles move according to a blending of the rules for multiple Eulerian fluid simulations and the rules of the world environment. Each separate simulation grid may have its own resolution, its own simulation qualities, positions, and velocities.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, simulations, calculations, logic blocks, processing, and other symbolic representations of operations on data within a computer system. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
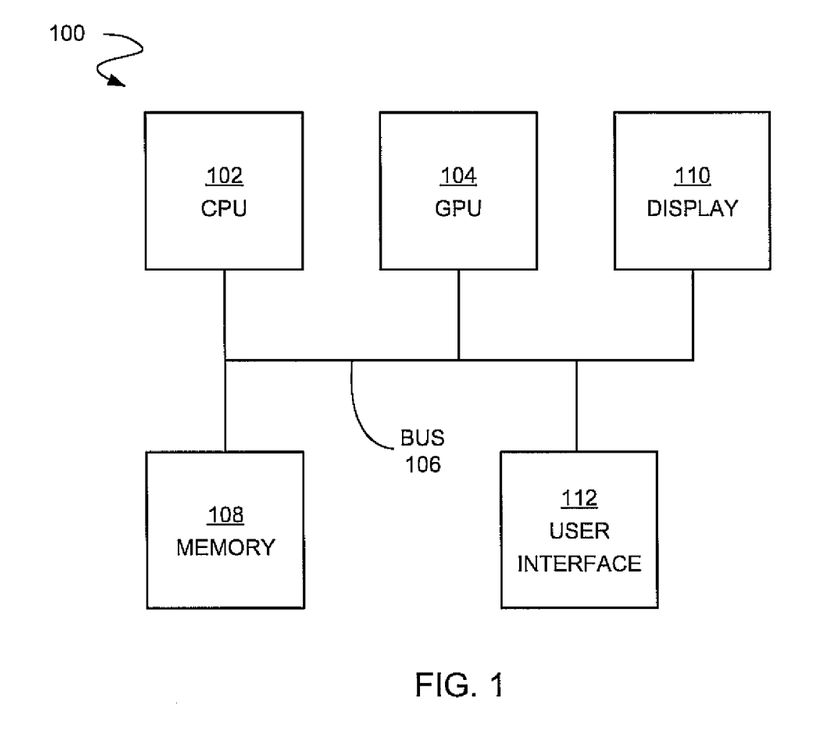
FIG. 1 is a block diagram of an example of a computer system within which a simulation in accordance with the present invention can be implemented.

FIG. 1 is a block diagram of an example of a general purpose graphics enabled computer system 100 within which a simulation in accordance with the present invention can be implemented. In the example of FIG. 1, the system includes a host central processing unit (CPU) 102 coupled to a graphics processing unit (GPU) 104 via a bus 106. One or more CPUs as well as one or more GPUs may be used.

Both the CPU 102 and the GPU 104 are coupled to memory 108. In the example of FIG. 1, the memory 108 may be a shared memory, whereby the memory stores instructions and data for both the CPU 102 and the GPU 104. Alternatively, there may be separate memories dedicated to the CPU 102 and GPU 104, respectively. The memory 108 can also include a video frame buffer for storing pixel data that drives a coupled display (screen) 110.

The system 100 also includes a user interface 112 that, in one implementation, includes an on-screen cursor control device. The user interface may include a keyboard, a mouse, a joystick, game controller, and/or a touch screen device (a touchpad).

Generally speaking, the system 100 includes the basic components of a computer system platform that implements functionality in accordance with embodiments of the present invention. The system 100 can be implemented as, for example, any of a number of different types of computer systems (e.g., servers, laptops, desktops, notebooks, and gaming systems), as well as a home entertainment system (e.g., a DVD player) such as a set-top box or digital television, or a portable or handheld electronic device (e.g., a portable phone, personal digital assistant, or handheld gaming device).

Figure 2:
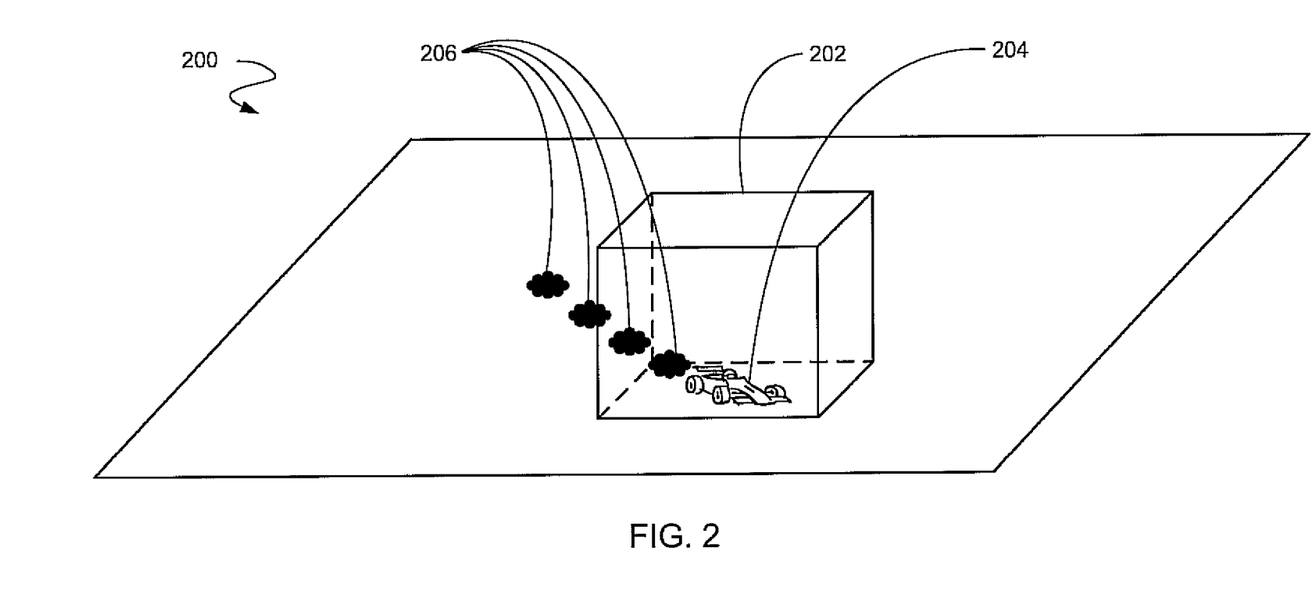
FIG. 2 is a graphical depiction of a method for using a finite Eulerian simulation grid in an interactive setting to give the appearance of an infinite simulation area in accordance with an embodiment of the present invention.

FIG. 2 is a graphical depiction 200 of a method for using a finite Eulerian simulation grid in an interactive setting to give an efficiently generated appearance of an infinite simulation area in accordance with an embodiment of the present invention. Simulation is the calculation of the velocity of a graphical element or elements. Animation is the updating, e.g. drawing, of the next frame. An Eulerian fluid simulation 202 is positioned in a 3d virtual world to track a region of interest 204 that moves based on user animation control. In the current embodiment, the region of interest 204 is an avatar whose position is determined under the control of a user. An avatar is any object under user control that represents the user, for example a vehicle, character, etc. The avatar could also be dynamically controlled via some other method, such as by an artificial intelligence algorithm. The user moves the avatar through a large virtual world, and it appears as if the world is filled with particles within a fluid that the avatar is moving through. However, rather than simulate the entire world with an enormous simulation grid, the Eulerian fluid simulation 202 is instead performed in a small region that is bounded around the region of interest 204 and moves with it. Particles 206, for example smoke, dust, leaves, etc., can be influenced by the Eulerian fluid simulation 202 when they are near the region of interest 204. When the particles 206 are outside the Eulerian fluid simulation 202, they are animated via simpler methods that do not require a fluid flow calculation on an Eulerian grid, such as, for example, Newtonian mechanics.

Figure 3:
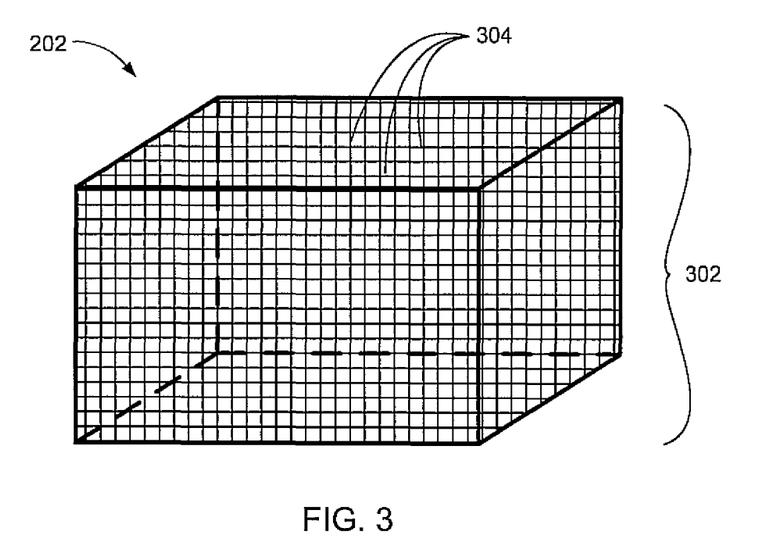
FIG. 3 is a depiction of the Eulerian fluid simulation grid.

FIG. 3 is a depiction of the Eulerian fluid simulation 202. The Eulerian fluid simulation 202 is a grid based simulation with a simulation grid 302. The simulation grid 302 is divided into a finite number of discrete spatial regions 304, for example by dividing space uniformly in 3 dimensions. Other methods for subdividing space into discrete regions may also be used. A velocity vector representing the motion of the fluid in each discrete spatial region 304 is computed using techniques from computational fluid dynamics. When the particles 206 (FIG. 2) are inside the simulation grid 302, they are pushed by the fluid and therefore animated. Thus, as the particles 206 (FIG. 2) move through the simulation grid 302, their movements, e.g. velocities, are affected by the discrete spatial regions 304 that the particles 206 (FIG. 2) encounter.

Outside the grid, generally, the velocities are computed by simpler rules, e.g. Newtonian mechanics.

Figure 4A:
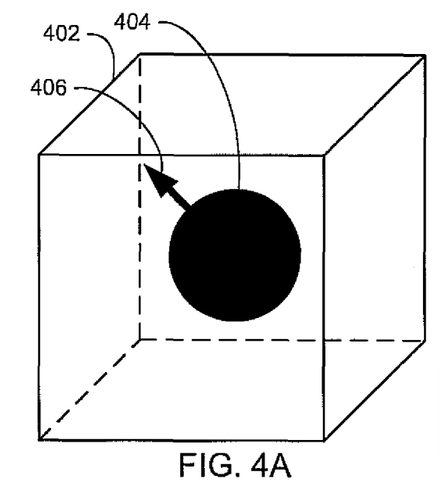
FIGS. 4A and 4B depict the principal of Galilean invariance, with respect to an Eulerian simulation grid.
Figure 4B:
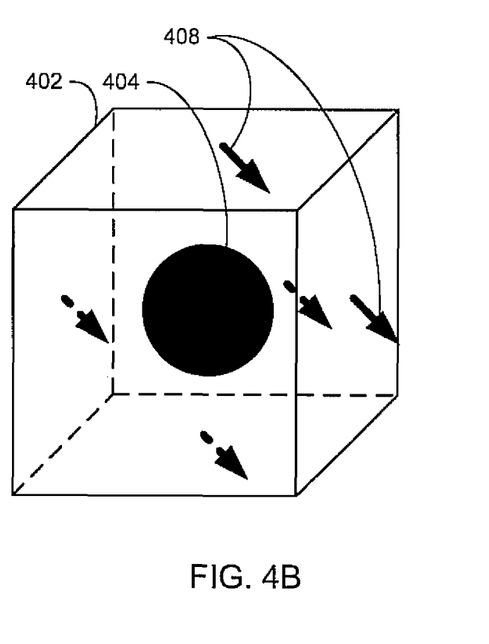

FIGS. 4A and 4B depict the principal of Galilean invariance. When the region of interest 204 (FIG. 2) is moving, Galilean invariance is used to center the Eulerian fluid simulation 202 (FIG. 2) on the region of interest 204 (FIG. 2) in accordance with an embodiment of the present invention. The principal of Galilean invariance holds that, from the point of view of a fluid coordinate frame, translating the fluid's coordinate frame by velocity v relative to an external coordinate frame is equivalent to having inflow and outflow boundary conditions at the edge of the simulation domain equal to −v. This is the same principle by which a wind tunnel works, e.g. rather than move a wing forward through motionless air, the air is blown backwards over the motionless wing. Thus, the Eulerian fluid simulation 202 (FIG. 2) is apparently moved in response to the user controlled avatar by modifying the inflow and outflow boundary conditions, and the position of the Eulerian fluid simulation 202 (FIG. 2) is fixed relative to the avatar. This provides the illusion that the simulation extents are infinite, since no matter how far the avatar moves, it is always surrounded by a fluid that reacts dynamically to its motion. Therefore, the terms "moving the grid" or "moving the coordinate frame" can be interpreted as shown in FIG. 4A or FIG. 4B.

For example, in FIG. 4A a simulation domain 402 is centered on a moving object of interest 404, in this case a moving disk. The moving object of interest 404 is moving in the direction illustrated by disk vector 406 at a velocity of v. In FIG. 4B inflow and outflow boundary conditions, illustrated by fluid velocity vectors 408, are applied at the faces of the simulation domain 402, which induce a uniform flow in the direction opposite the moving object of interest's 404 velocity, −v. At any time, the center of the simulation domain 402 will be the same as the center of the moving object of interest 404 in world space. In addition, to convert from a fluid velocity vector 408 in the simulation domain 402 into a world space velocity vector, v must be added.

Thus in accordance with an embodiment of the present invention, the simulation domain is translated based on, for example, the disk's velocity, which is under user control, some static animation, or to automatically follow a feature in the flow. This allows a user to explore a large virtual fluid simulation by moving a character through it, and calculating interactions of the character with the fluid in a limited-extent region of interest around the character.

In addition, the fluid affects other objects in the virtual environment. For example, smoke particles can be generated in world space using some rule. For example, to simulate tire smoke, particles are generated in regions under the four tires of a car and under the entire car body. The birth probability depends on acceleration and velocity. Gravity and drag forces are randomized per-particle to enhance the visual appearance. When the particles are inside the simulation grid that surrounds the region of interest, their velocity is generally determined by the Eulerian fluid simulation. When the particles are outside the region of interest, their velocity is generally determined by some other rules, such as Newtonian mechanics, inertia, or some other simpler physics.

Figure 5:
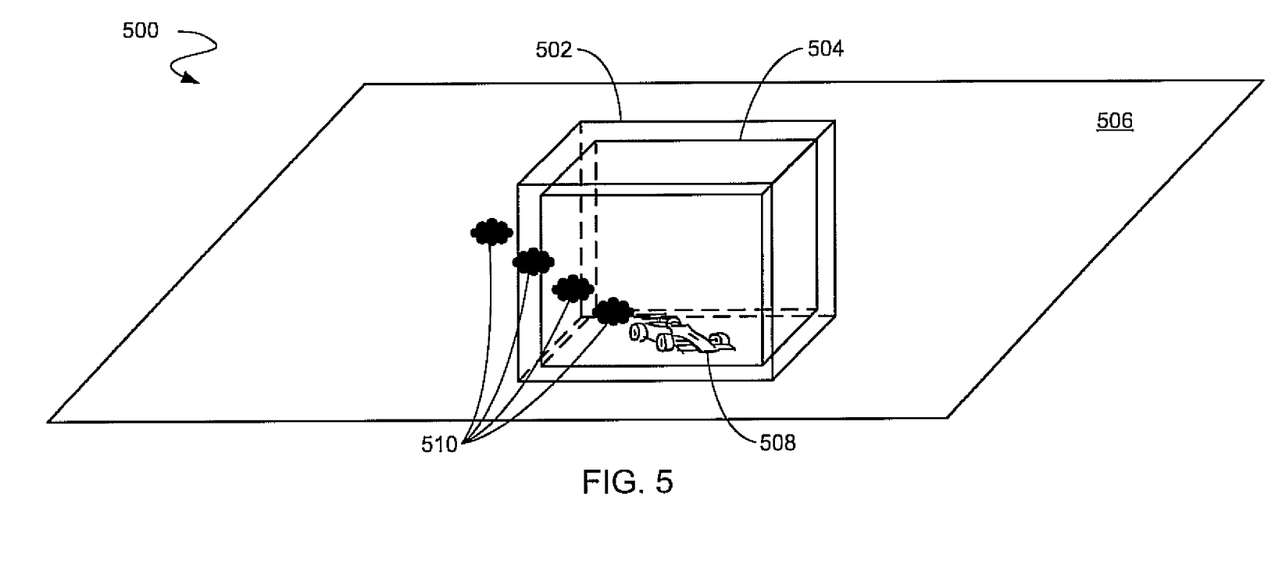
FIG. 5 is a graphical depiction of a method for using blending with a finite Eulerian simulation grid in an interactive setting in accordance with an embodiment of the present invention.

FIG. 5 is a graphical depiction 500 of a method for using blending with a finite Eulerian simulation grid in an interactive setting in accordance with an embodiment of the present invention. In one embodiment, a blending region 502 surrounds an Eulerian fluid simulation grid 504. The blending region 502 blends the more complex rule set of the Eulerian fluid simulation grid 504 with the simpler rule set of an outside region 506. Thus, the blending region 502 smoothly blends velocities computed under the Eulerian fluid simulation grid 504 and the outside region 506 that does not depend on the Eulerian simulation, allowing for visually seamless transitions between the two regions. In this fashion, the resulting animation does not include any box shaped artifacts surrounding the avatar 508.

For example, an avatar 508, a car in the current example, is controlled by a user and driven through the outside region 506, e.g. a virtual world. The avatar 508 is surrounded by the Eulerian fluid simulation grid 504. The Eulerian fluid simulation grid 504 follows the avatar 508 in response to the user's control of the avatar 508. The velocity of the fluid is calculated at each discrete location inside the simulation grid 504. As particles 510 encounter the internal region of the fluid environment of the Eulerian fluid simulation grid 504, the particles 510 are animated according to a rule set that is based on the velocities that have been computed for the Eulerian fluid simulation grid 504. Particles 510 that are outside the Eulerian fluid simulation and in the outside region 506 are animated according to a simpler rule set, for example momentum and simple gravity, of the outside region 506. However, within the blending region 502, particles 510 are animated according to a blending of the rules for the Eulerian fluid simulation grid 504 and the rules for the outside region 506. The amount of contribution of each rule set in the final blended result may be based on the particles' position within the blended region.

Particles move under the influence of a fluid velocity field as massless marker particles when inside the region of interest, and follow simple Newtonian dynamics with momentum, gravity, and drag when outside the region of interest. The blend weights depend on the position of each particle relative to the simulation domain. For a particle at position Pos, the blend weight in the x dimension is calculated as:

$$w_x = \text{clamp}\left(0, 1, \min\left(\frac{Pos_x - \text{Min}_x}{\beta}, \frac{\text{Max}_x - Pos_x}{\beta}\right)\right)$$

where $\text{Min}_x$ and $\text{Max}_x$ are the extents of the (axis-aligned) simulation domain in world space, and the parameter $\beta$ controls the width of the blend region. Because the simulations grids lie coincident with the ground plane, $w_y$ does not fall off to zero in the negative y direction. The final weight is then min $(w_x, w_y, w_z)$. In an embodiment, $\beta$ is chosen to be the width of a few grid cells, but the simulation results are fairly insensitive to varying this value.

Figure 6:
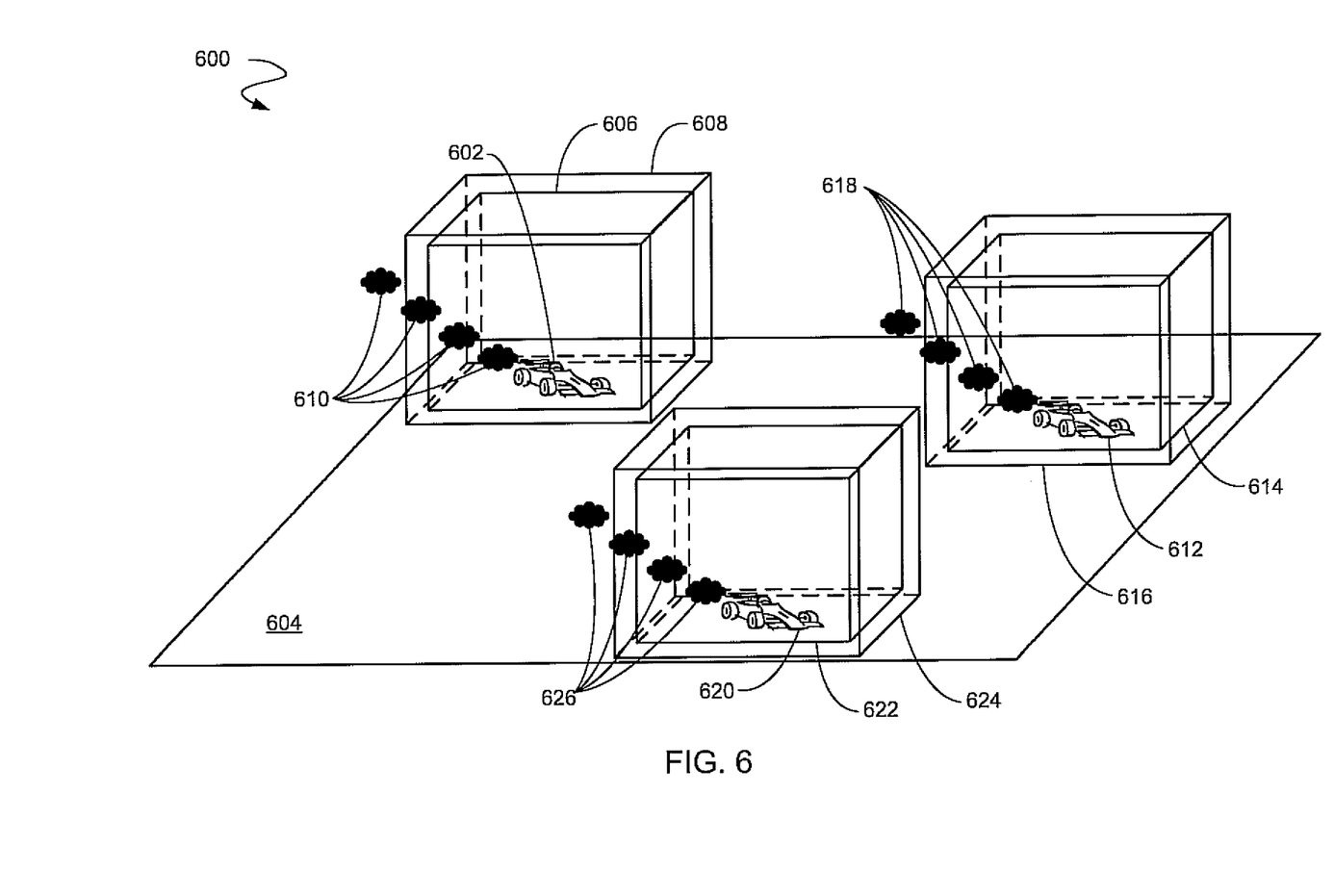
FIG. 6 is a graphical depiction of a method of multiple finite Eulerian simulation grids in an interactive setting in accordance with an embodiment of the present invention.

FIG. 6 is a graphical depiction 600 of a method of multiple finite Eulerian simulation grids in an interactive setting in accordance with an embodiment of the present invention. A first user controls a first avatar 602 in a world space 604. A first fluid coordinate frame 606 surrounds the first avatar 602 as the first avatar 602 moves through the world space 604. The velocities of the fluid are computed based on the motion of the avatar 602. A first blending region 608 exists between the first fluid coordinate frame 606 and the world space 604. Velocities of first particles 610 inside the first fluid coordinate frame 606 are simulated according to a first inside rule set at an instant in time when the first particles 610 happen to be located within the first fluid coordinate frame 606. Velocities of the first particles 610 in the world space 604 are calculated according to a world space rule set at an instant in time when the first particles 610 happen to be located within the world space 604. Velocities of the first particles 610 inside the first blending region 608 are simulated according to a blending of the first inside rule set and the world space rule set at an instant in time when the first particles 610 happen to be located within the first blending region 608.

In addition, a second user controls a second avatar 612 in the world space 604. A second fluid coordinate frame 614 surrounds the second avatar 612 as the second avatar 612 moves through the world space 604. A second blending region 616 exists between the second fluid coordinate frame 614 and the world space 604. Velocities of second particles 618 inside the second fluid coordinate frame 614 are simulated according to a second inside rule set. Velocities of the second particles 618 in the world space 604 are calculated according to a world space rule set. Velocities of the second particles 618 inside the second blending region 616 are simulated according to a blending of the second inside rule set and the world space rule set.

In the current embodiment, a computer may automatically control a third avatar 620 in the world space 604, e.g. by some artificial intelligence algorithm. A third fluid coordinate frame 622 surrounds the third avatar 620 as the third avatar 620 moves through the world space 604. A third blending region 624 exists between the third fluid coordinate frame 622 and the world space 604. In alternate embodiments, any number of user controlled avatars and computer controlled avatars can exist in a world space. Velocities of third particles 626 inside the third fluid coordinate frame 622 are simulated according to a third inside rule set. Velocities of the third particles 626 in the world space 604 are calculated according to a world space rule set. Velocities of the third particles 626 inside the third blending region 624 are simulated according to a blending of the third inside rule set and the world space rule set.

Figure 7:
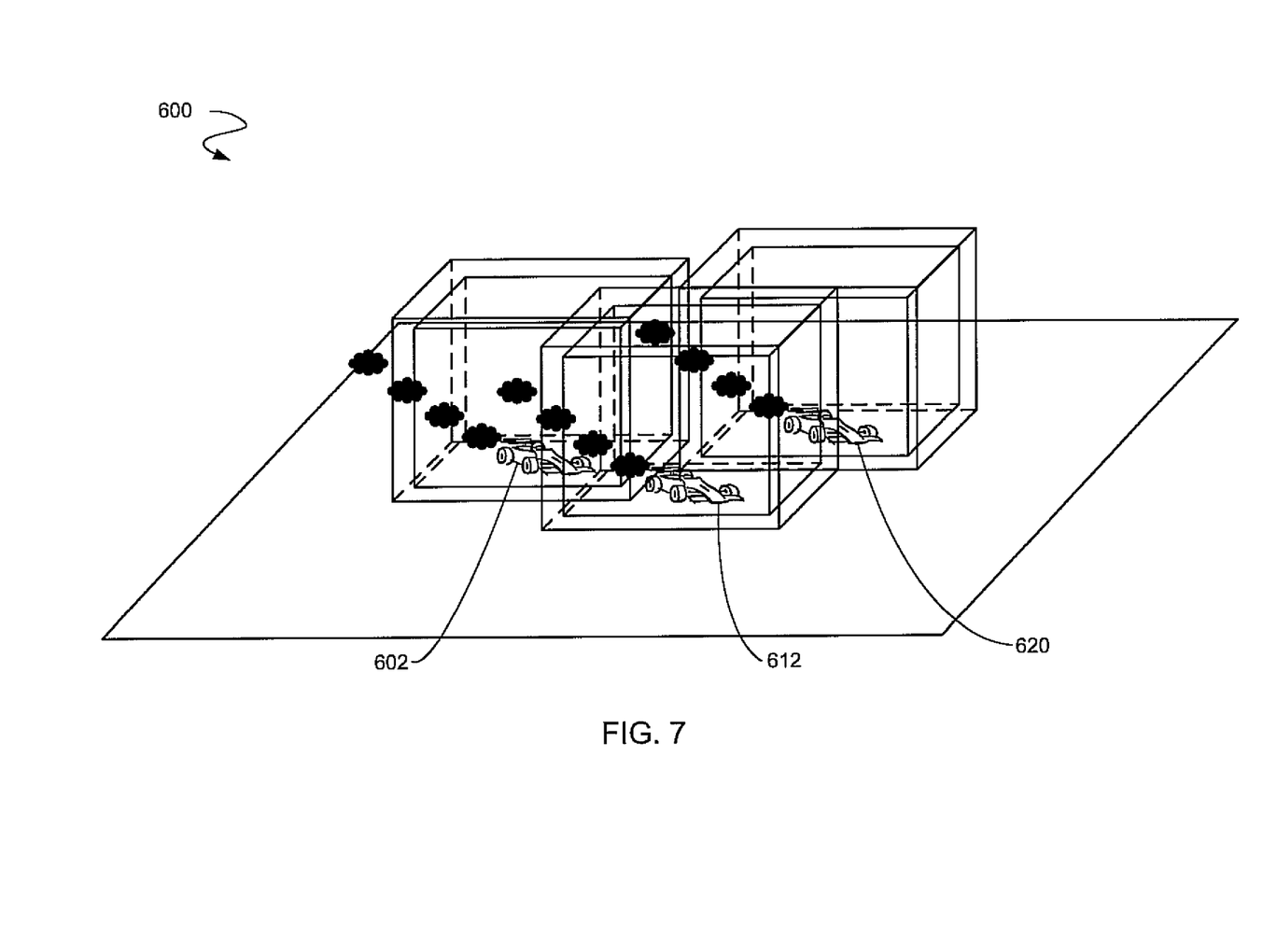
FIG. 7 is the graphical depiction of a method of multiple finite Eulerian simulation grids in an interactive setting with overlapping regions.

FIG. 7 is the graphical depiction 600 of a method of multiple finite Eulerian simulation grids in an interactive setting with overlapping simulation regions. The first user has moved the first avatar 602, the second user has moved the second avatar 612, and the computer has moved the third avatar 620 so that portions of first and second regions overlap and portions of second and third regions overlap.

A particle can move under the influence of any number of Eulerian fluid simulations. Furthermore, the position of the particle relative to the Eulerian fluid simulations affects the velocity. Thus the interpolated velocity becomes a weighted blend $$Vel_{inside} = \frac{w^A Vel_{inside}^A + w^B Vel_{inside}^B}{w^A + w^B}$$

where $w^A$ and $w^B$ are the weights of the particle position relative to the two simulation grids. When the particle overlaps only one of the simulations, this is equivalent to the single-simulation case. Larger numbers of simulation grids are handled similarly. Thus, velocity of a particle under the influence of multiple Eulerian fluid simulations and the outside simulation is calculated as an inside blended velocity of the multiple Eulerian fluid simulations. The final velocity is calculated as a blended velocity of the inside blended velocity and the outside velocity.

This simple blending rule has the benefit of being efficient and stable. Other options include choosing the velocity vector with the highest magnitude or some other non-linear blending rule. A simple linear combination obscures the boundaries of the different simulation domains. As a consequence of visualizing multiple simulations via their effects on particles is that the fluid simulations are not required to be coupled. Rather, the simulations all respond to the same set of (world space) boundary conditions resulting from the moving avatars. Multiple moving objects can all appear to interact with particle systems, even without any coupling of the fluid dynamics calculations.

In the one embodiment, the multiple fluid simulations have no interaction between themselves, thus greatly simplifying their implementation. However, the multiple fluid simulations can influence the same particles. Thus a particle can calculate the world-space velocity at its position in several different simulation domains, each with different resolutions, simulation qualities, positions, and velocities. The particle may use some rule to choose a final world-space velocity as a blended average of all of these simulation velocities. In this way, it is possible to have a variety of configurations of overlapping regions of interest.

One embodiment includes a car, where there is one large simulation domain that covers the entire car, and four smaller simulation domains centered one on each wheel. This allows for more detailed fluid motion around the wheels.

One embodiment includes a car that drives and kicks up a turbulent wake around it. The simulation domain is fixed relative to the car. Smoke particles are generated under the tires and are advected through the fluid simulation while they are inside the simulation domain. Leaves may start out motionless on the ground, and get pushed around the wake as the car drives by. When the particles and leaves exit the region of interest, they follow some other animation rule, such as simple Newtonian dynamics. Multiple cars may be tracked, each with its own translating simulation domain.

One embodiment includes a character in a jet pack that flies through a cloud. The simulation domain is centered on the character. Outside the simulation domain, the cloud particles move according to some simple turbulence or swirling rule. Inside the simulation domain, they respond to the simulated fluid motion.

One embodiment includes a character walking through a field with low-hanging mist. The simulation domain is centered on the character. Outside of the simulation domain, the mist particles hang motionless. Inside the simulation grid, they respond to the simulated fluid motion. Multiple characters may be tracked.

One embodiment includes a submarine driving through an underwater world. Particulate matter floats in the water, suspended or moving under simple pre-calculated current motion. A simulation domain is centered on the submarine. The particles move under the influence of the simulation when near the submarine.

Figure 8:
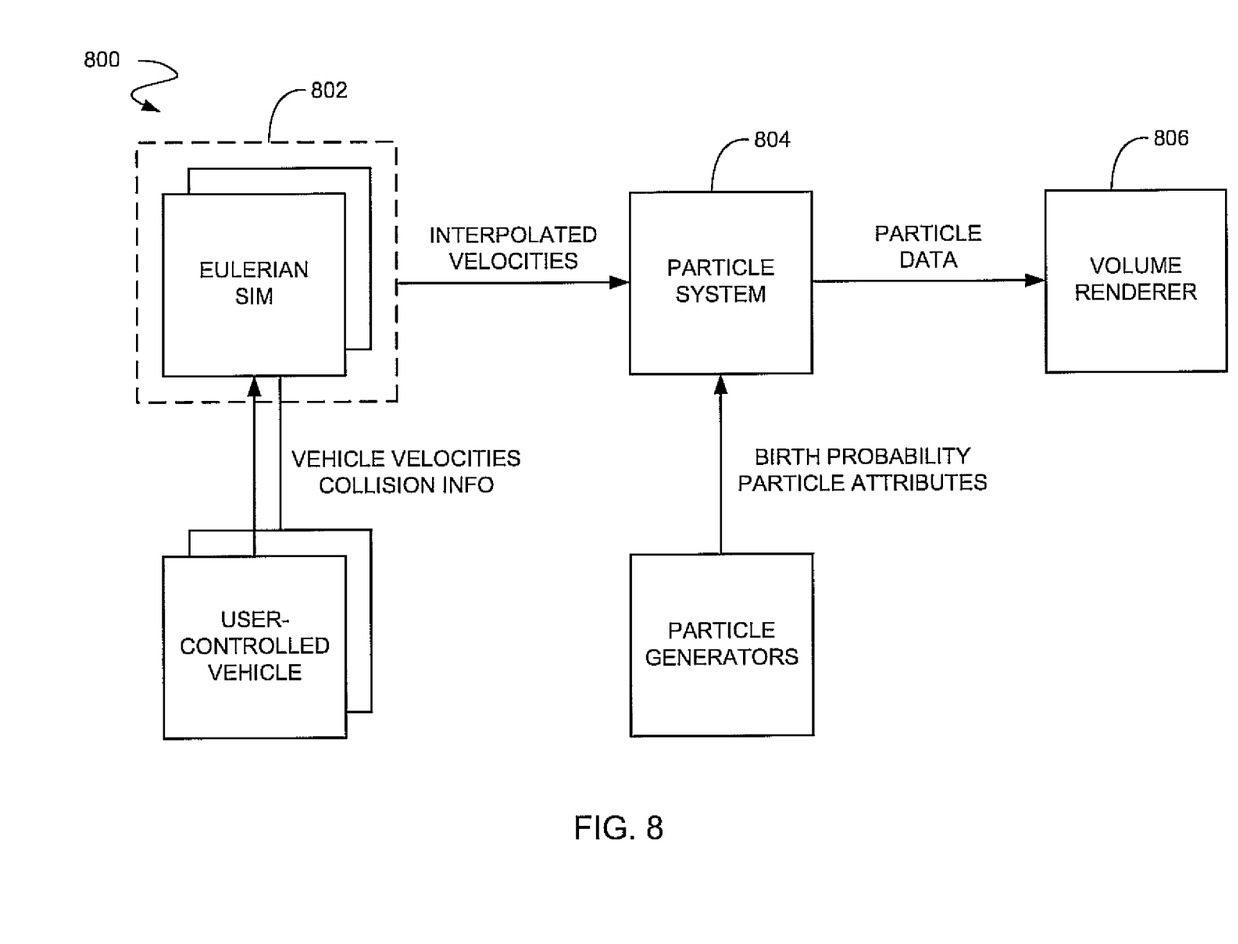
FIG. 8 is a schematic overview of a computer implemented simulation system suitable for implementing embodiments of the present invention.

FIG. 8 is an exemplary schematic overview of a simulation system 800 suitable for implementing embodiments of the present invention. The system 800 consists of three components: a GPU-optimized Eulerian incompressible inviscid Navier-Stokes solver 802, a GPU-optimized particle engine 2804, and a hardware volume rendering system 806. The Navier-Stokes solver 802, uses numerical methods that are stable and have constant per-frame computation time, and are accurate enough to capture visually important flow features. By using Galilean invariance, a fluid domain translates so as to follow a moving object, such as a car. The particle system 804 is driven by a calculated fluid velocity field for particles inside the fluid domain, and follows other rules such as Newtonian dynamics for particles outside the fluid domain. Because the transition from inside to outside is seamless, the actual extents of the fluid domain are visually obscured. When the particles are used to simulate participating media such as dust or smoke, the particles are rendered via the volume rendering system 206. Other rendering methods may be used for other types of particles.

Figure 9:
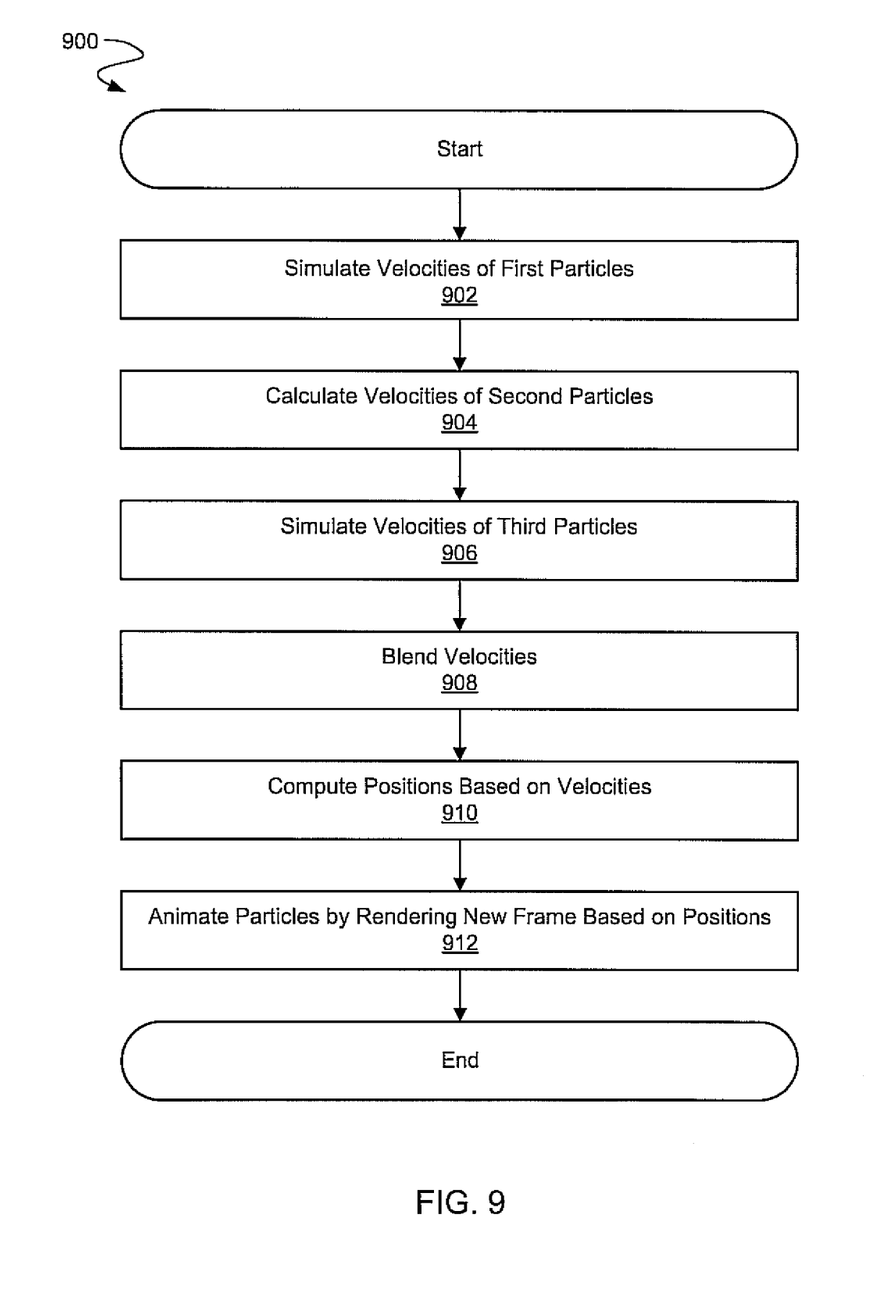
FIG. 9 depicts a flowchart of an exemplary computer implemented method of using a finite Eulerian simulation grid in an interactive setting to give the appearance of an infinite simulation area in accordance with an embodiment of the present invention.

FIG. 9 depicts a flowchart 900 of an exemplary method of using a finite Eulerian simulation grid in an interactive setting to give the appearance of an infinite simulation area in accordance with an embodiment of the present invention. In a step 902, velocities of particles inside a first fluid coordinate frame are simulated based on a first rule set inside the first fluid coordinate frame, and the first fluid coordinate frame has a first boundary region with a first coordinate frame. For example, in FIG. 6 a user controls the avatar 602. The computer recognizes input from the user and moves the avatar in an environment based on the input. The first fluid coordinate frame also moves in response to the user input, keeping itself centered around the avatar 602.

The avatar 602 creates particles, e.g. graphical elements, in response to input from the user. In the current embodiment, the particles begin their movement in response to movement of the avatar. As the inside particles continue to move inside the first fluid coordinate frame, their movements obey a first rule set, e.g. an Eulerian simulation.

In a step 904, velocities of particles outside the first fluid coordinate frame are calculated based on a second rule set inside the first coordinate frame. For example, in FIG. 6 particles have moved outside of the fluid coordinate frame and into the virtual world, e.g. the first coordinate frame. As the outside particles move in the first coordinate frame of the virtual world, their movements obey a second rule set, e.g. simple gravity.

In a step 906, velocities of particles inside a second fluid coordinate frame are simulated based on a third rule set inside the second fluid coordinate frame, and the second fluid coordinate frame has a second boundary region with the first coordinate frame. For example, in FIG. 6 a computer controls avatar 620. Thus, avatar 620 automatically responds to computer driven direction. In addition, the second fluid coordinate frame moves in response to the computer input, keeping itself centered around the avatar 620.

The avatar 620 creates particles in response to input from the computer. In the current embodiment, the particles begin their movement in response to movement of the avatar. As the inside particles continue to move inside the first fluid coordinate frame, their movements obey a first rule set, e.g. an Eulerian simulation. When the particles move out into the first coordinate frame of the virtual world, their movements obey the second rule set.

The first fluid coordinate frame has the first boundary region with the first coordinate frame. In addition, the second fluid coordinate frame has the second boundary region with the first coordinate frame. Thus in the current embodiment, the first boundary region is partially within the first fluid coordinate frame and partially within the first coordinate frame. In addition, the second boundary region is partially within the second fluid coordinate frame and partially within the first coordinate frame. Furthermore in an alternate embodiment, the second boundary region is partially within the first fluid coordinate frame, the second fluid coordinate frame, and partially within the first coordinate frame. For example, in FIG. 7 the avatars have moved relatively close to each other, causing coordinate frames to overlap.

In a step 908, velocities within the boundary regions are calculated as a combination of rule sets. For particles within the first boundary region, velocities are calculated as a combination of their velocities computed according to the inside first rule set and the outside second rule set. For particles within the second boundary region, velocities are calculated as a combination of their velocities computed according to the inside third rule set and the outside second rule set. In an alternate embodiment, particles within the second boundary region are calculated as a combination of their velocities computed according to the inside first rule set, the outside second rule set, and the inside third rule set.

For example, in FIG. 6 the avatars are relatively far apart, and their respective fluid coordinate frames do not overlap. Thus, velocities of the particles within the boundary regions obey a rule set that is a blending of inside and outside rule sets. However, in FIG. 7 the avatars are relatively close together, and their respective fluid coordinate frames overlap. Thus, velocities of the particles within the boundary regions of overlapping fluid coordinate frames obey a rule set that is a blending of several inside rule sets and the outside rule set. The blended rule sets provide a visually smooth transition between coordinate frames.

In a step 910, positions of particles in each coordinate frame are computed based on determined velocities for particles in each coordinate frame. Furthermore, in a step 912 the particles are animated in each coordinate frame. For example, in FIG. 5 users see particles moving according to a complex simulation of the motion of the fluid surrounding the avatars. As the particles travel very far away from the avatars, the particles move according to a simple rule set in the outside region. As the particles travel through an intermediate distance, they move according to a combination of these two rule sets.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of simulation comprising:
   controlling an animated object in an environment;
   simulating movement of graphical elements in a coordinate frame surrounding said animated object, wherein said movement of said graphical elements in said coordinate frame is constrained by a first rule set;
   animating said graphical elements;
   animating a first region surrounding said coordinate frame, wherein animation of said graphical elements in said first region is constrained by a second rule set; and
   moving said coordinate frame in response to said controlling of said animated object.

2. The method of claim 1 further comprising animating a second region between said coordinate frame and said first region, wherein animation of said graphical elements in said second region is constrained by said first rule set and said second rule set.

3. The method of claim 1 further comprising animating a second region between said coordinate frame and said first region, wherein animation of said graphical elements in said second region is constrained by at least a portion of said first rule set and at least a portion of said second rule set.

4. The method of claim 1 wherein controlling said animated object comprises:
   recognizing input from a user; and
   moving said animated object in said environment based on said input.

5. The method of claim 1 wherein controlling said animated object comprises automatically responding to computer driven direction.

6. The method of claim 1 wherein said movement of said graphical elements is in response to movement of said animated object.

7. The method of claim 1 wherein moving said coordinate frame in response to said controlling of said animated object, further comprises fixing said coordinate frame relative to said animated object.

8. A method of simulation comprising:
simulating velocities of first particles based on a first rule set inside a first coordinate frame, wherein said first coordinate frame has a first boundary region with a first coordinate frame;
calculating velocities of second particles based on a second rule set inside said first coordinate frame, wherein said first boundary region is partially within said first coordinate frame and partially within said first coordinate frame;
for particles within said first boundary region, calculating velocities as a blending of their velocities computed according to said first and said second rule sets;
based on determined velocities for particles in each coordinate frame, computing positions of said particles in each coordinate frame; and
animating said particles in each coordinate frame.

9. The method of claim 8 further comprising:
simulating velocities of third particles based on a third rule set inside a second coordinate frame,
wherein said second coordinate frame has a second boundary region with said first coordinate frame; and
wherein said second boundary region is partially within said coordinate frame and partially within said first coordinate frame; and
for particles within said second boundary region, calculating velocities as a blending of their velocities computed according to said third and second rule sets.

10. The method of claim 8 further comprising:
simulating velocities of third particles based on a third rule set inside a second coordinate frame,
wherein said second coordinate frame has a second boundary region with said first coordinate frame, and
wherein said second coordinate frame has said second boundary region with said first coordinate frame;
wherein said second boundary region is partially within said first coordinate frame, partially within said second coordinate frame, and partially within said first coordinate frame; and
for particles within said second boundary region, calculating velocities as a blending of their velocities computed according to said first, second, and third rule sets.

11. The method of claim 10 further comprising automatically moving said second coordinate frame in response to computer input.

12. The method of claim 8 further comprising moving said first coordinate frame in response to user input.

13. The method of claim 8 further comprising creating particles in response to user input.

14. The method of claim 8 wherein said first rule set is an Eulerian fluid simulation and said second rule set is Newtonian mechanics.

15. A system of simulation comprising:
a processor;
memory coupled to said processor;
instructions stored within said memory that when executed cause said system perform a method comprising:
simulating velocities of inside particles based on a first rule set inside a first coordinate frame, wherein said first coordinate frame has a first boundary region with a first coordinate frame;
calculating velocities of outside particles based on a second rule set inside said first coordinate frame, wherein said first boundary region is partially within said first coordinate frame and partially within said coordinate frame;
for boundary particles within said first boundary region, calculating velocities as a blending of their velocities computed according to said first and said second rule sets;
based on determined velocities for particles in each coordinate frame, computing positions of said particles in each coordinate frame; and
animating said particles in each coordinate frame.

16. The system of claim 15 wherein said method further comprises:
simulating velocities of second inside particles based on a third rule set inside a second coordinate frame,
wherein said second coordinate frame has a second boundary region with said first coordinate frame; and
wherein said second boundary region is partially within said second coordinate frame and partially within said first coordinate frame; and
for second boundary particles within said second boundary region, calculating velocities as a blending of their velocities computed according to said third and second rule sets.

17. The system of claim 15 wherein said method further comprises:
simulating velocities of second inside particles based on a third rule set inside a second coordinate frame,
wherein said second coordinate frame has a second boundary region with said first coordinate frame, and
wherein said second coordinate frame has said second boundary region with said first coordinate frame;
wherein said second boundary region is partially within said first coordinate frame, partially within said second coordinate frame, and partially within said first coordinate frame; and
for second boundary particles within said second boundary region, calculating velocities as a blending of their velocities computed according to said first, second, and third rule sets.

18. The system of claim 17 wherein said method further comprises automatically moving said second coordinate frame in response to computer input.

19. The system of claim 15 wherein said method further comprises moving said first coordinate frame in response to user input.

20. The system of claim 15 wherein said simulating comprises simulating said inside particles inside said first coordinate frame using an Eulerian simulation.

* * * * *